UNITED STATES PATENT OFFICE

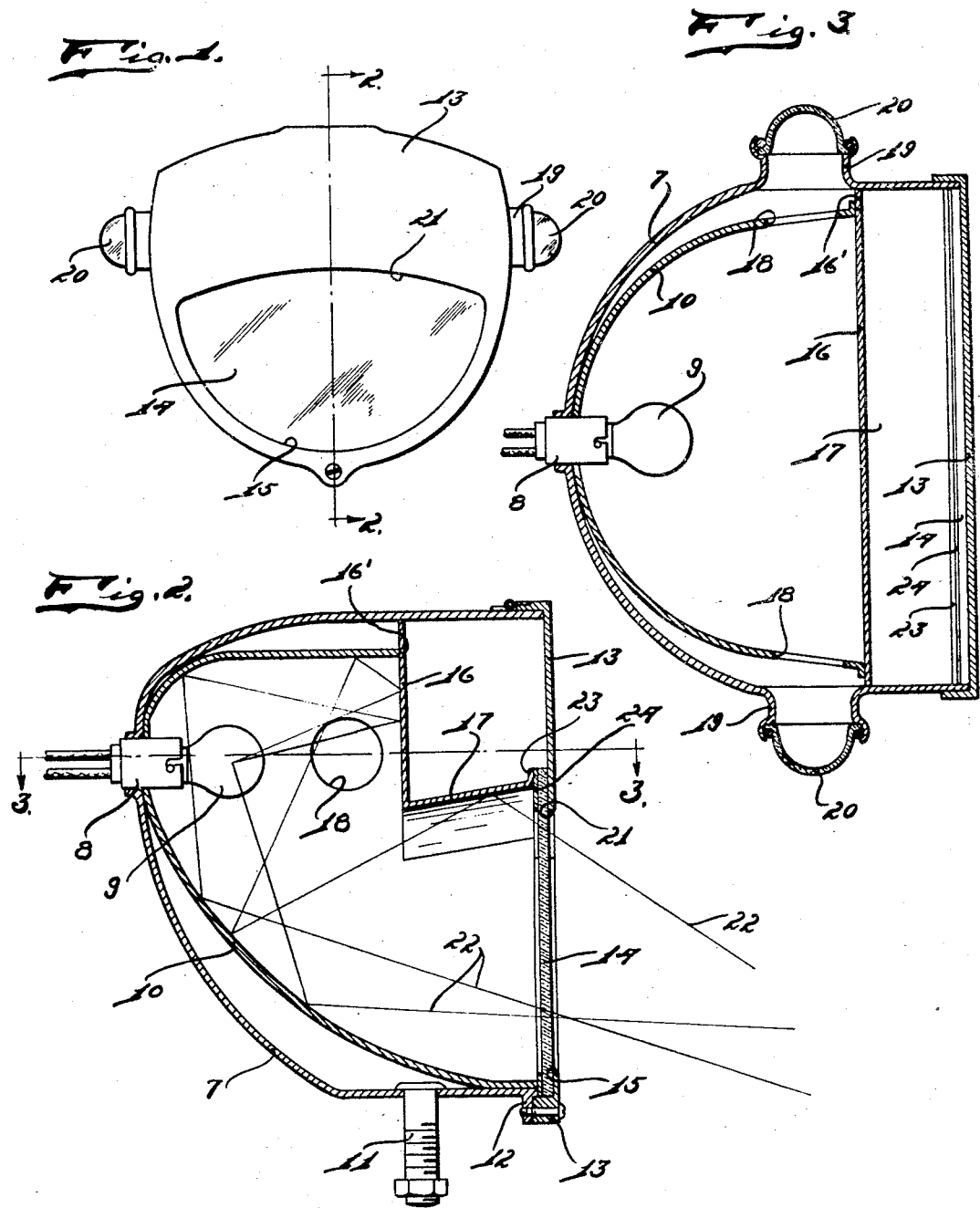

PAUL RING, OF DETROIT, MICHIGAN

HEADLIGHT

Application filed March 29, 1929. Serial No. 350,992.

My invention relates to a new and useful improvement in a headlight for use particularly on vehicles of the automobile type and has for its object the provision of a headlight which will serve to illuminate ahead of the vehicle and at the same time direct the rays of light in such a way so as not to interfere with the vision of drivers of approaching vehicles.

It is another object of the present invention to provide a headlight having openings at opposite sides through which the light rays may be projected and provided with means for deflecting the light rays sufficiently to maintain a proper degree of illumination at said openings.

Another object of the invention is the provision of a vehicle headlight having in connection with a reflecting member, a light bulb positioned above and rearwardly of a deflecting member.

Another object of the invention is the provision of a deflecting member which may be easily and quickly placed in position in the headlight and removed therefrom.

Other objects will appear hereinafter.

The invention consists in the combination and arrangement of parts hereinafter described and claimed.

The invention will be best understood from a reference to the accompanying drawings which form a part of this specification, and in which, Fig. 1 is a front elevational view of the invention.

Fig. 2 is a sectional view taken on line 2—2 of Fig. 1.

Fig. 3 is a sectional view taken on line 3—3 of Fig. 2.

In the drawings I have illustrated the invention applied to a headlight having an outer shell 7 in which is positioned a socket 8 in which the light bulb 9 is adapted to be mounted, this light bulb 9 projecting through the inner reflector 10 which is positioned within the shell 7. A bolt 11 serves as means for mounting the headlight in position. Projecting outwardly from the periphery of the shell 7 is a flange 12 against which engages the closure 13 which is hingedly mounted and provided with an opening 15 closed by the lens 14.

A deflecting member is positioned in the headlight and comprises a vertically extending wall 16 which projects beyond the reflector 10 which is cut away as at 16', this vertically extending wall 16 engaging the inner wall of the shell 7. An angularly turned portion 17 is formed on the lower end of the wall 16, this portion being downwardly rearwardly inclined as shown in Fig. 2 and being also formed arcuate to conform to the curvature 21 of the opening 15 which is formed in the closure 13.

Formed in the reflector 10 at opposite sides are openings 18 aligning with a neck 19 which is formed integral with the shell 7 and in which is positioned a transparent or translucent closure 20.

The headlight, when constructed in this manner, is one which will permit its use with such intensity as to clearly illuminate the roadway ahead of the vehicle without, in any manner, interfering with the vision of the drivers of approaching vehicles, the light rays being deflected and reflected as shown by the lines 22 in Fig. 2. The portion 17 is provided with the upwardly turned edge 23 which engages an inner ring 24 also serving as a retainer for the closure 14. The vertically extending wall 16 serves to deflect sufficient of the light so that sufficient light passes through the openings 18 to shine through the closures 20, thus affording protection by rendering the vehicle visible from its sides.

While I have illustrated and described the preferred form of my invention, I do not wish to limit myself to the precise details of structure shown but desire to avail myself of such variations and modifications as come within the scope of the appended claim.

Having thus described my invention, what I claim as new and desire to secure by Letters Patent is:

A headlight of the class described comprising: an outer shell; a reflector positioned within said shell and extending at its lower edge to the outer edge of said shell and terminating at its upper edge well inwardly of the upper edge of said shell; an insertable member in said shell comprising a vertically extending wall forming portion engageable with the upper edge of said reflector and projecting downwardly therefrom; a curved inclined portion on the lower edge of said wall forming portion projecting forwardly and upwardly therefrom; a light bulb mounted in said shell interiorly of said reflector and positioned above the lower edge of said wall forming portion, said shell and said reflector having aligning side openings formed therein above the lower edge of said wall forming portion and between said wall forming portion and said light bulb.

In testimony whereof I have signed the foregoing specification.

PAUL RING.